United States Patent [19]
Saito

[11] Patent Number: 5,841,906
[45] Date of Patent: Nov. 24, 1998

[54] GRAPHIC FORM RECOGNITION APPARATUS

[75] Inventor: Shigeru Saito, Tokyo, Japan

[73] Assignee: NEC Corporation, Tokyo, Japan

[21] Appl. No.: 976,184

[22] Filed: Nov. 21, 1997

Related U.S. Application Data

[63] Continuation of Ser. No. 364,225, Dec. 27, 1994, abandoned.

[30] Foreign Application Priority Data

Dec. 28, 1993 [JP] Japan ................................. 5-334647

[51] Int. Cl.$^6$ .................................................... G06K 9/46
[52] U.S. Cl. ........................................... 382/203; 382/201
[58] Field of Search ..................... 382/202, 203, 382/241, 197, 198, 242, 201; 345/443, 441

[56] References Cited

U.S. PATENT DOCUMENTS

| | | | |
|---|---|---|---|
| 4,718,103 | 1/1988 | Shojima et al. | 382/241 |
| 4,771,469 | 9/1988 | Wittenburg | 382/203 |
| 4,771,474 | 9/1988 | Takashima et al. | 382/241 |
| 4,969,201 | 11/1990 | Takasaki et al. | 382/203 |
| 5,036,544 | 7/1991 | Sakaue et al. | 382/202 |
| 5,065,439 | 11/1991 | Takasaki et al. | 382/203 |
| 5,121,442 | 6/1992 | Togawa et al. | 382/203 |
| 5,204,915 | 4/1993 | Nishida | 382/198 |
| 5,313,528 | 5/1994 | Nishida | 382/202 |
| 5,471,407 | 11/1995 | Akasaka et al. | 382/199 |

FOREIGN PATENT DOCUMENTS

| | | |
|---|---|---|
| 50-14862 | 5/1975 | Japan . |
| 59-083278 | 5/1984 | Japan . |
| 2-278480 | 11/1990 | Japan . |

OTHER PUBLICATIONS

1985, Martine D. Levine, Vision in Man and Machine, p. 507 and p. 512.

*Primary Examiner*—Von J. Couso
*Attorney, Agent, or Firm*—Foley & Lardner

[57] ABSTRACT

A graphic form recognition apparatus which can extract a singular point of a curved line portion precisely is disclosed. The apparatus comprises a coordinate point string reading section for reading in a string of coordinate points of a graphic form of lines inputted from an inputting apparatus, a storage apparatus for storing the string of coordinate points thus read in, a distance thinning out or deletion section for thinning out or deleting points of the string of coordinate points at a fixed distance, an elevation angle calculation section for calculating angles of elevation provided by the remaining coordinate point string, an elevation angle most frequent value calculation section for calculating a most frequent value which appears most frequently among all of the thus calculated angles of elevation, a difference calculation section for calculating differences between the angles of elevation and the most frequent value, and a recognition section for recognizing each coordinate point, at which the difference of the angle of elevation from the most frequent value is higher than a predetermined value, as a singular point of the inputted graphic form of lines.

2 Claims, 5 Drawing Sheets

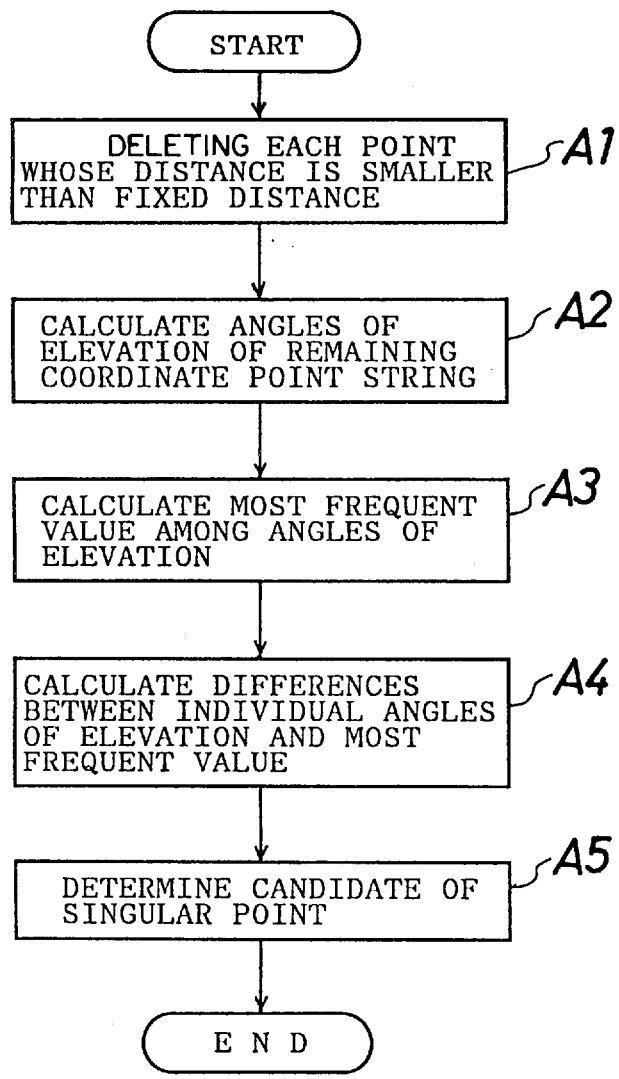

SINGULAR POINT

ANGLE OF ELEVATION

MOST FREQUENT VALUE

SINGULAR POINT

GRAPHIC FORM RECOGNITION APPARATUS

This application is a continuation of application Ser. No. 08/364,225, filed Dec. 27, 1994, now abandoned.

BACKGROUND OF THE INVENTION

1. Field of the Invention

This invention relates to a graphic form recognition apparatus which extracts characteristic points of an inputted graphic form of lines by computer processing to recognize the graphic form, and more particularly to a graphic form recognition apparatus of the type wherein a graphic form of lines inputted by way of an inputting apparatus is converted into a string of coordinate points and divided at each of the characteristic points into sections which can be regarded as line segments of basic line types and then the positional relationship of the characteristics or the line types of the sections are corrected to approximate the graphic form or the compatibility between the characteristic points or the line types of the sections and memory data stored in memory is calculated to recognize the type of the graphic form.

2. Description of the Related Art

Conventionally, graphic form recognition apparatus of the type mentioned are used to extract straight line segments or portions and curved line segments or portions of a graphic form. One of conventional graphic form recognition apparatus of the type mentioned is disclosed, for example, in Japanese Patent Laid-Open Application No. Heisei 2-278480. In the graphic form recognition apparatus, an inputted graphic form is approximated by discriminating it into straight line portions and curved line portions. In particular, the graphic form recognition apparatus includes a junction discrimination section which extracts an inputted string of coordinate points as a set of successive linear short vectors and calculates the angle between and/or the magnitudes of each two adjacent linear short vectors to classify the connection relationship of each two adjacent linear short vectors into an "angle", a "curved line connecting to a straight line", a "straight line connecting to a curved line" or a "point on a curved line", and a linear short vector discrimination section which discriminates the line types of the linear short vectors from the thus classified connection relationships in accordance with a discrimination method described in an attribute information setting section.

The conventional graphic form recognition apparatus described above, however, is disadvantageous in that, since it discriminates only straight line portions and curved line portions, it cannot extract such a singular point as a point of inflection in a curved line at which the curved line exhibits a sudden variation.

SUMMARY OF THE INVENTION

It is an object of the present invention to provide a graphic form recognition apparatus which can extract a singular point of a curved line portion precisely.

In order to attain the object described above, according to an aspect of the present invention, there is provided a graphic form recognition apparatus, which comprises coordinate point string reading means for reading in a string of coordinate points of a graphic form of lines inputted from an inputting apparatus, a storage apparatus for storing the string of coordinate points read in by the coordinate point string reading means, distance thinning out or deletion means for thinning out or distance basis deletion of certain points from the string of coordinate points stored in the storage apparatus at a fixed distance, elevation angle calculation means for calculating values of angles of elevation provided by the remaining coordinate point string after the distance thinning out or deletion processing by the distance thinning out or deletion means for the individual coordinate points of the string, elevation angle most frequent value calculation means for calculating a most frequent value which appears most frequently among all of the values of the angles of elevation calculated by the elevation angle calculation means, difference calculation means for calculating differences between the values of the angles of elevation calculated by the elevation angle calculation means and the most frequent value calculated by the elevation angle most frequent value calculation means, and recognition means for recognizing each coordinate point, at which the difference of the value of the angle of elevation from the most frequent value calculated by the difference calculation means is higher than a predetermined value, as a singular point of the inputted graphic form of lines.

In the graphic form recognition apparatus, after a string of coordinate points is thinned out or points are deleted at the fixed distance, an angle of elevation is calculated for each coordinate point of the remaining coordinate point string after the thinning out or deletion processing, and then a most frequent value is calculated from among the angles of elevation thus calculated. Then, a coordinate point at which the difference of the value of the angle of elevation from the most frequent value is higher than the predetermined value is recognized as a singular point of the inputted graphic form of lines. Consequently, with the graphic form recognition apparatus, any singular point can be extracted precisely.

According to another aspect of the present invention, there is provided a graphic form recognition apparatus, which comprises coordinate point string reading means for reading in a string of coordinate points of a graphic form of lines inputted from an inputting apparatus, a storage apparatus for storing the string of coordinate points read in by the coordinate point string reading means, distance thinning out or deletion means for thinning out or deletion of points from the string of coordinate points stored in the storage apparatus at a fixed distance, first elevation angle calculation means for calculating a value of an angle of elevation provided by the remaining coordinate point string after the distance thinning out or deletion processing by the distance thinning out or deletion means for each of the coordinate points of the string, elevation angle thinning out or deletion means for thinning out or deletion a coordinate point when the value of the angle of elevation at the coordinate point is low, second elevation angle calculation means for calculating new values of angles of elevation provided by the remaining coordinate point string after the elevation angle thinning out or deletion processing by the elevation angle thinning out or deletion means, elevation angle most frequent value calculation means for calculating a most frequent value which appears most frequently among all of the values of the angles of elevation calculated by the second elevation angle calculation means, difference calculation means for calculating differences between the values of the angles of elevation calculated by the elevation angle calculation means and the most frequent value calculated by the elevation angle most frequent value calculation means, and recognition means for recognizing each coordinate point, at which the difference of the value of the angle of elevation from the most frequent value calculated by the difference calculation means is higher than a predetermined value, as a singular point of the inputted graphic form of lines.

Also with the graphic form recognition apparatus, any singular point can be extracted precisely because it operates in a similar manner as the graphic form recognition apparatus of the first aspect of the present invention. Further, with the graphic form recognition apparatus, a straight line and a curved line can be classified roughly from each other depending upon the magnitude of the most frequent value.

The above and other objects, features and advantages of the present invention will become apparent from the following description and the appended claims, taken in conjunction with the accompanying drawings in which like parts or elements are denoted by like reference characters.

BRIEF DESCRIPTION OF THE DRAWINGS

FIG. 2 is a flow chart illustrating a processing procedure of the graphic form recognition apparatus of FIG. 1;

DESCRIPTION OF THE PREFERRED EMBODIMENTS

Figure 1:
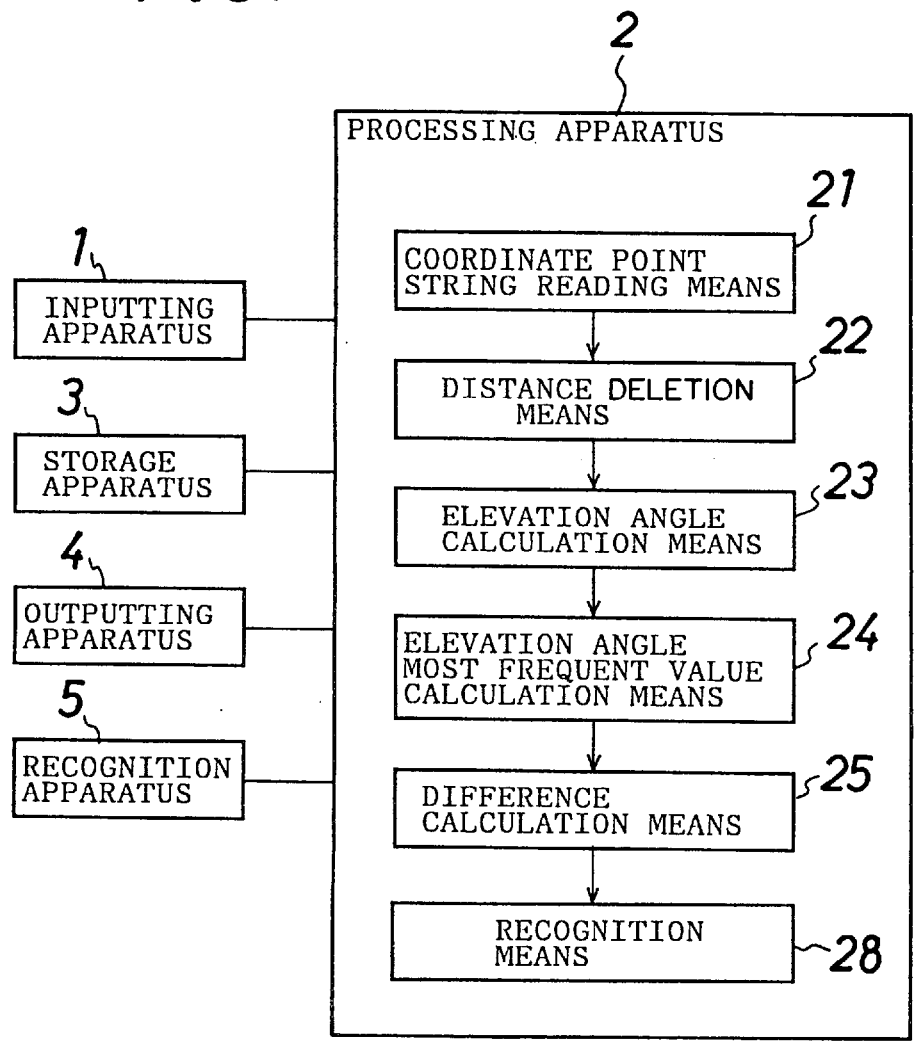
FIG. 1 is a block diagram of a graphic form recognition apparatus showing a first preferred embodiment of the present invention.

Referring first to FIG. 1, there is shown a graphic form recognition apparatus according to a first preferred embodiment of the present invention. The graphic form recognition apparatus shown includes an inputting apparatus 1 which may be such as a conventional tablet and an associated inputting pen for inputting a graphic form, a processing apparatus 2 which operates in accordance with a program, a storage apparatus 3 for storing a string of coordinate points obtained from a graphic form inputted by way of the inputting apparatus 1, an outputting apparatus 4 such as a display unit, a printer or a plotter for outputting a graphic form, and a recognition apparatus 5 for specifying a candidate graphic form.

The processing apparatus 2 includes coordinate point string reading means 21 for reading in a string of coordinate points (on an X-Y coordinate system) of a graphic form inputted from the inputting apparatus 1 when the graphic form is written on and inputted to the inputting apparatus 1, distance thinning out or delection means 22 for thinning out or deleting the coordinate points of the string at each fixed distance, elevation angle calculation means 23 for calculating the values of angles of elevation individually provided by successively interconnecting the coordinate points of the string after being thinned out or deleted by the distance thinning out or delection means 22, elevation angle most frequent value calculation means 24 for calculating a most frequent value of an angle of elevation from the values of all of the angles of elevation, difference calculation means 25 for calculating the differences between the individual angles of elevation and the most frequent value calculated by the elevation angle most frequent value calculation means 24, and recognition means 28 for recognizing each coordinate point, at which the difference calculated by the difference calculation means is higher than a predetermined value, as a singular point of the inputted graphic form of lines.

Figure 3A:
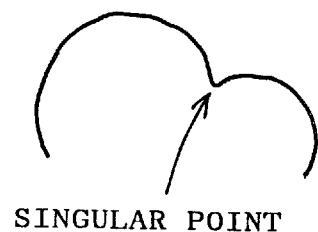
FIGS. 3(a) and 3(b) illustrate an example of a string of coordinate points obtained from an inputting apparatus of the graphic form recognition apparatus of FIG. 1.
Figure 3B:
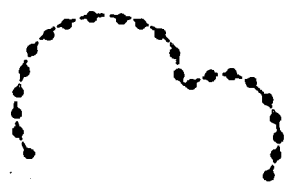
Figure 4:
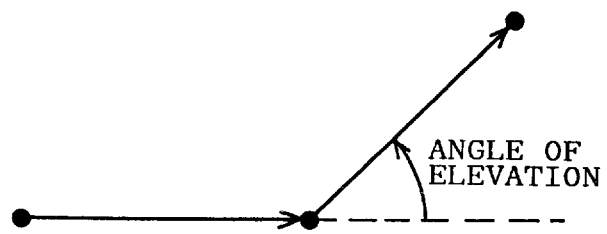
FIG. 4 is a diagrammatic view showing an angle of elevation defined by two lines interconnecting three successive coordinate points.
Figure 5:
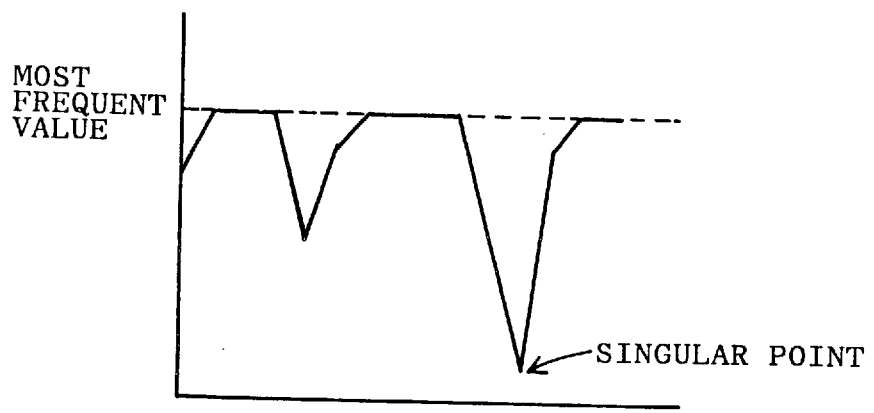
FIG. 5 is a graph illustrating the variation of the angle of elevation calculated by the graphic form recognition apparatus of FIG. 1.

FIG. 2 illustrates the processing procedure of the graphic form recognition apparatus of FIG. 1. Meanwhile, FIG. 3(a) shows an example of a hand-written graphic form inputted by way of the inputting apparatus 1 while FIG. 3(b) illustrates an example of a string of coordinate points actually provided from the inputting apparatus 1 to the coordinate point string reading means 21 when the hand-written graphic form shown in FIG. 3(a) is inputted. Further, FIG. 4 shows an example of an angle of elevation provided by interconnecting three successive points, and FIG. 5 shows a graph of an example of the variation in value of the angle of elevation obtained from the elevation angle calculation means 23. Operation of the graphic form recognition apparatus of FIG. 1 will be described below with reference to FIGS. 1 to 5.

A string of coordinate points inputted by way of the inputting apparatus 1 and read in by the coordinate point string reading means 21 is inputted to the distance thinning out or deletion means 22. The distance thinning out or deletion means 22 thins out or deletes a trailing one of two successive points when the distance between the two points is smaller than a fixed distance (step A1 in FIG. 2). This processing is performed for all of the inputted coordinate points one after another as they are inputted. In this processing, when thinning out or delection processing is performed actually, the remaining one of the two points and a further point next to the thinned out or deleted point make object points for the next thinning out or deletion processing. In contrast, when none of the two points is thinned out or deleted actually, the trailing one of the two points and a further point next to the trailing point make object points for the next thinning out or deletion processing. The processing at step A1 reduces the possible bad influence of noise which may be caused by an inadvertent shake of the hand.

The string of the remaining coordinate points after processing at step A1 is inputted to the elevation angle calculation means 23. The elevation angle calculation means 23 calculates the value of an angle of elevation from each of three successive adjacent coordinate points of the coordinate point string inputted thereto (step A2). Here, the angle of elevation is an angle defined by an extension line of a straight line interconnecting first and second ones of the three successive points and another straight line interconnecting the second and third ones of the three successive points as seen in FIG. 4.

After all of such angles of elevation provided by the coordinate point string are calculated, the elevation angle most frequent value calculation means 24 calculates a most frequent value among the values of the angles of elevation (step A3). Here, the most frequent value signifies the value of an angle of elevation which appears most frequently among all of the calculated angles of elevation.

The difference calculation means 25 subtracts the most frequent value calculated by the elevation angle most frequent value calculation means 24 from the individual values of the angles of elevation to calculate differences between them (step A4). Then, the recognition means 28 recognizes the line segment as a straight line when the most frequent value is approximate to 0, but recognizes the line segment as a curved line when the most frequent value is higher than a certain fixed value. Further, the recognition means 28 recognizes a coordinate point at which the difference of the angle of elevation from the most frequent value is higher than a predetermined value as a singular point of the curved section of the inputted graphic form of lines as shown in FIG. 5 (step A5).

Then, the recognition apparatus 5 specifies a candidate graphic form in a known manner using the characteristic data calculated by the processing described above such as the singular points, the angles of elevation, the distinctions between straight and curved lines and the lengths of the line segments.

Figure 6:
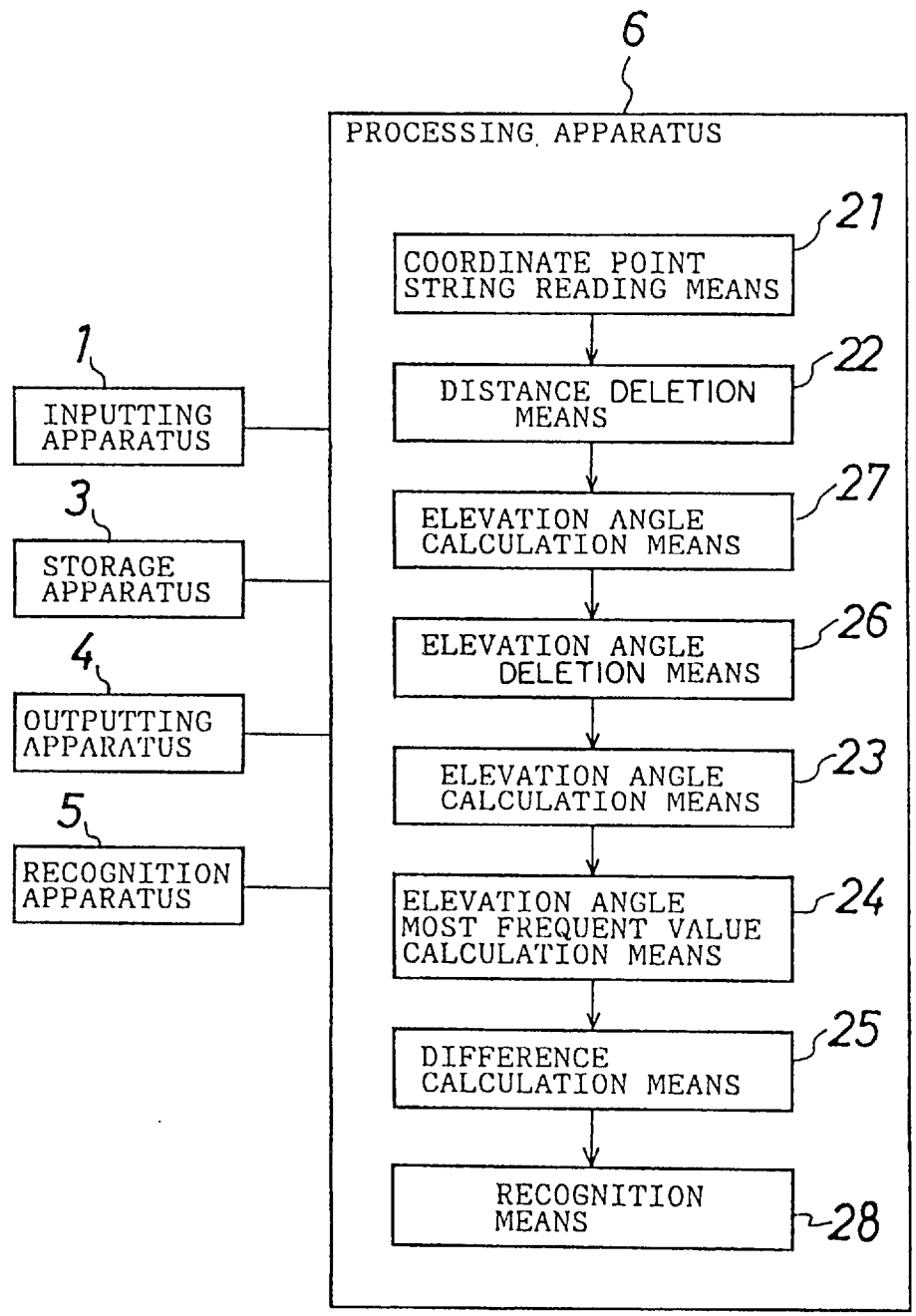
FIG. 6 is a block diagram of another graphic form recognition apparatus showing a second preferred embodiment of the present invention.
Figure 7:
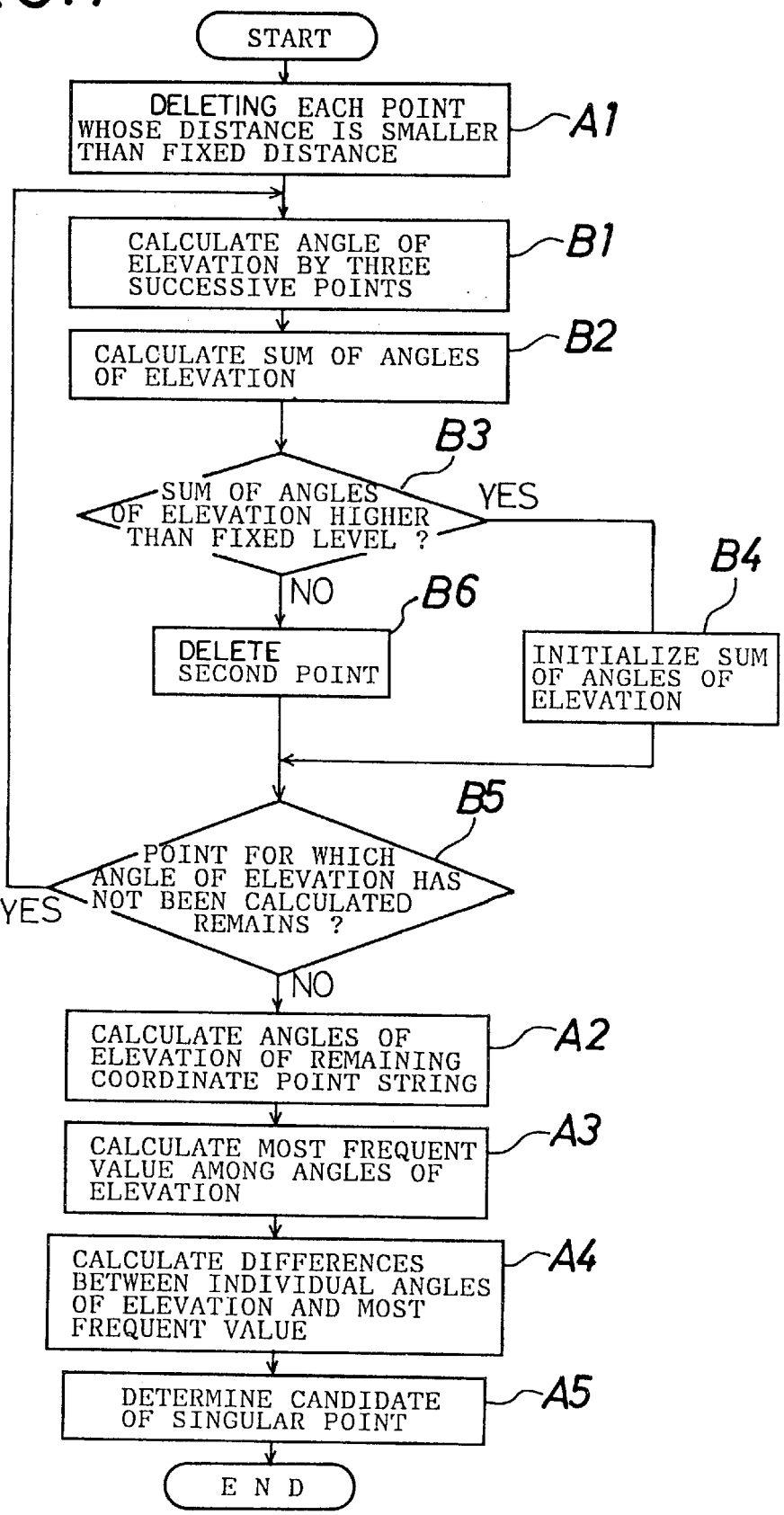
FIG. 7 is a flow chart illustrating a processing procedure of the graphic form recognition apparatus of FIG. 6.

FIG. 6 shows a graphic form recognition apparatus according to a second preferred embodiment of the present invention, and FIG. 7 illustrates a processing procedure of the graphic form recognition apparatus of FIG. 6.

Referring first to FIG. 6, the graphic form recognition apparatus shown is a modification to and is different from the graphic form recognition apparatus of FIG. 1 only in that it includes, in place of the processing apparatus 2, another processing apparatus 6 which includes, in addition to the components 21 to 25 of the processing apparatus 2 described above, another elevation angle calculation means 27 for calculating the value of an angle of elevation defined by two lines successively interconnecting each three successive coordinate points of the string after being thinned out or deleted by the distance thinning out or deletion means 22, and elevation angle thinning out means 26 for thinning out a coordinate point when the angle of elevation at the coordinate point calculated by the elevation angle calculation means 27 is small. In this instance, the elevation angle calculation means 23 calculates new values of angles of elevation for the remaining coordinate point string after the elevation angle thinning out or deletion processing by the elevation angle thinning out or deletion means 26.

In operation, referring to FIG. 7, the graphic form recognition apparatus first operates similarly as at step A1 of the graphic form recognition apparatus of FIG. 1. After the processing at step A1, the remaining coordinate point string is inputted to the elevation angle calculation means 27.

The elevation angle calculation means 27 thus calculates the value of an angle of elevation from three successive coordinate points of the coordinate point string inputted thereto from the distance thinning out or deletion means 22 (step B1) and cumulatively adds the thus calculated value of the angle of elevation to a sum of angles of elevation calculated until then (step B2). The elevation angle thinning out or deletion means 26 retains the second point of the successive three points when the sum calculated by the elevation angle calculation means 23 is higher than a certain fixed value. In this instance, the sum of angles of elevation is initialized (steps B3 and B4). Subsequently to step B4, the control sequence advances to step B5. On the other hand, when the sum calculated by the elevation angle calculation means 23 is not higher than the certain fixed value at step B3, the elevation angle thinning out or deletion means 26 deletes or thins out the second point of the successive three points (at step B6), whereafter the control sequence advances to step B5. At step B5, it is determined whether or not there remains a coordinate point for which the angle of elevation has not been calculated. If the determination at step B5 is in the positive (YES), the control sequence returns to step B1 in order to calculate the value of another angle of elevation using the first or second and third points and a next point to the third point by means of the elevation angle calculation means 27.

After calculation of an angle of elevation is performed for all of the coordinate points of the inputted coordinate point string and it is determined at step B5 that there remains no coordinate point for which the angle of elevation has not been calculated, the string of the remaining coordinate points is inputted to the elevation angle calculation means 23. Thereafter, the graphic form recognition apparatus operates similarly at steps A2 to A5 as in the first embodiment described hereinabove.

The processing at steps B1 to B5 described above is effective to make the angle of elevation at a straight line portion of a moderately curved line portion fixed. In particular, the number of angles of elevation which have an equal value is increased, and consequently, the possibility that the value may be a most frequent value increases. As a result, the difference between the angles of elevation at a singular point and any other point becomes further definite.

Having now fully described the invention, it will be apparent to one of ordinary skill in the art that many changes and modifications can be made thereto without departing from the spirit and scope of the invention as set forth herein.

What is claimed is:

1. A graphic form recognition apparatus, comprising:

coordinate point string reading means for reading in a string of coordinate points of an inputted graphic form of lines inputted from an inputting apparatus;

a storage apparatus for storing the string of coordinate points read in by said coordinate point string reading means;

distance deletion means for distance deletion processing for individual coordinate points of the string of coordinate points stored in said storage apparatus at a fixed distance between the coordinate points;

elevation angle calculation means for calculating values of angles of elevation provided by a remaining coordinate point string after the distance deletion processing by said distance deletion means for the individual coordinate points of the string;

elevation angle most frequent value calculation means for calculating a most frequent value which appears most frequently among all of the values of the angles of elevation calculated by said elevation angle calculation means;

difference calculation means for calculating differences between the values of the angles of elevation calculated by said elevation angle calculation means and the most frequent value calculated by said elevation angle most frequent value calculation means; and recognition means for recognizing the inputted graphic form of lines as a straight line when the most frequent value is less than a first predetermined value and as a curved line when the most frequent value exceeds the first predetermined value, and for recognizing each coordinate point at which the difference of the value of the angle of elevation and the most frequent value exceeds a second predetermined value as a singular point of the inputted graphic form of lines.

2. A graphic form recognition apparatus, comprising:

coordinate point string reading means for reading in a string of coordinate points of an inputted graphic form of lines inputted from an inputting apparatus;

a storage apparatus for storing the string of coordinate points read in by said coordinate point string reading means;

distance deletion means for distance deletion processing for each of the coordinate points of the string of coordinate points stored in said storage apparatus at a fixed distance between the coordinate points;

first elevation angle calculation means for calculating a value of an angle of elevation provided by a remaining coordinate point string after the distance deletion processing by said distance deletion means for each of the coordinate points of the string;

elevation angle deletion means for elevation angle deletion processing of a coordinate point when the value of the angle of elevation at the coordinate point is lower than a fixed value;

second elevation angle calculation means for calculating new values of angles of elevation provided by a remaining coordinate point string after the elevation angle deletion processing by said elevation angle deletion means;

elevation angle most frequent value calculation means for calculating a most frequent value which appears most frequently among all the new values of angles of elevation calculated by said second elevation angle calculation means;

difference calculation means for calculating differences between the new values of the angles of elevation calculated by said second elevation angle calculation means and the most frequent value calculated by said elevation angle most frequent value calculation means; and recognition means for recognizing the inputted graphic form of lines as a straight line when the most frequent value is less than a first predetermined value and as a curved line when the most frequent value exceeds the first predetermined value, and for recognizing each coordinate point at which the difference of the value of the angle of elevation and the most frequent value exceeds a second predetermined value as a singular point of the inputted graphic form of lines.

* * * * *